W. B. SEELEY.
PORTABLE STOVE.
APPLICATION FILED APR. 11, 1908.
936,482.
Patented Oct. 12, 1909.
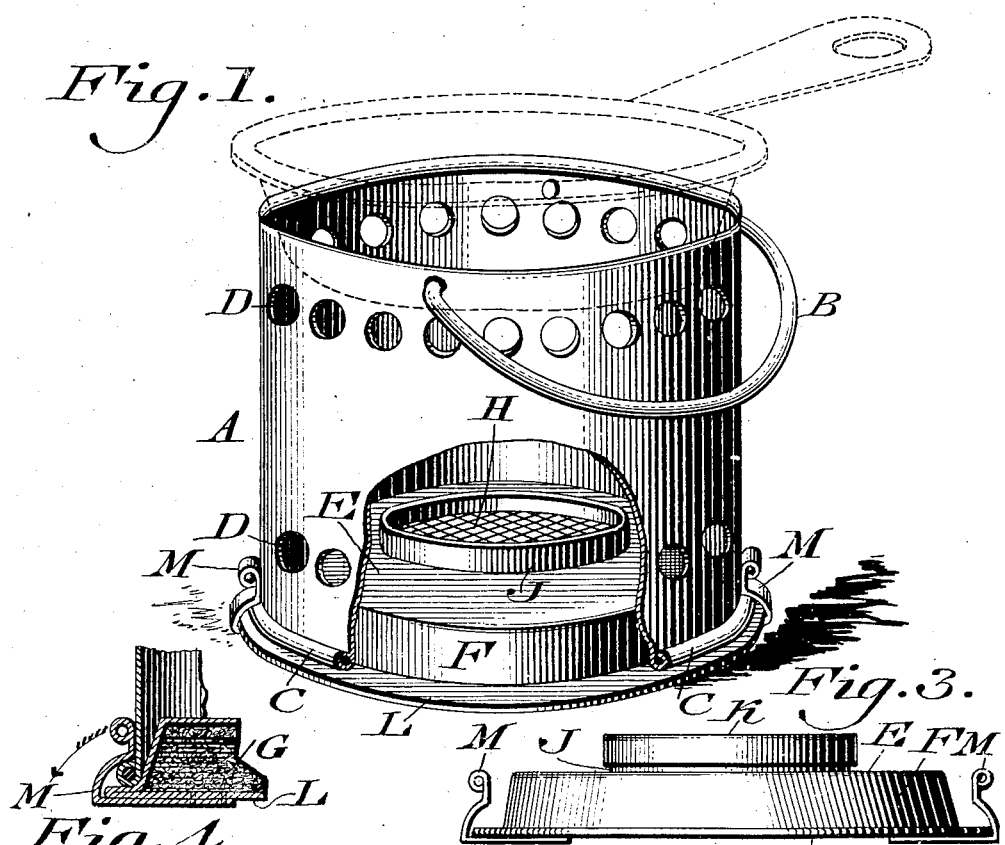
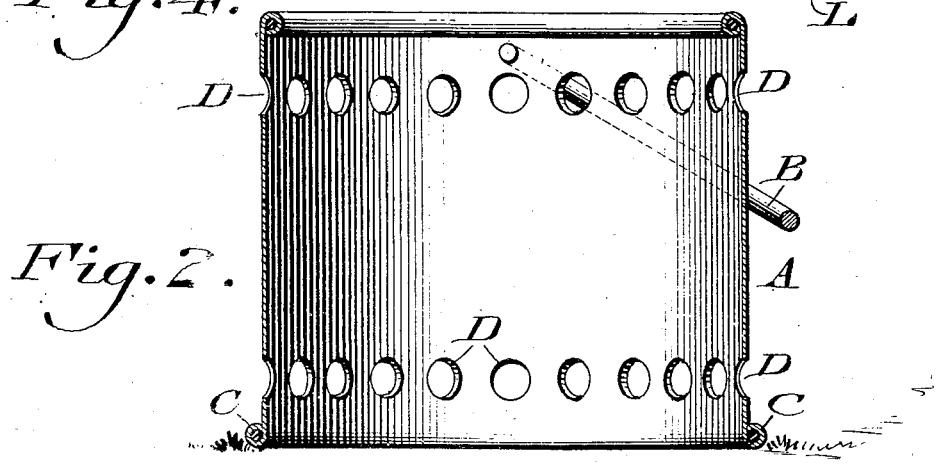

UNITED STATES PATENT OFFICE.

WALTER B. SEELEY, OF PHILADELPHIA, PENNSYLVANIA.

PORTABLE STOVE.

936,482.  Specification of Letters Patent.  Patented Oct. 12, 1909.

Application filed April 11, 1908. Serial No. 426,513.

*To all whom it may concern:*

Be it known that I, WALTER B. SEELEY, a citizen of the United States, residing in the city and county of Philadelphia, State of Pennsylvania, have invented a new and useful Portable Stove, of which the following is a specification.

My invention consists of a portable stove adapted for use by automobilists, tourists and others, the same embodying a cylinder on which a stewing, frying, cooking pan, kettle or other culinary vessel may be supported and an alcohol, gasolene or other lamp, which is readily connectible with said cylinder and serves to provide the necessary heat, said lamp being detachable from said cylinder, so that when the alcohol, gasolene or other fluid is exhausted, the cylinder may be placed on the ground and receive fuel for evident purposes.

For the purpose of explaining my invention, the accompanying drawing illustrates a satisfactory reduction of the same to practice, but the important instrumentalities thereof may be varied, and so it is to be understood that the invention is not limited to the specific arrangement and organization shown and described.

Figure 1 represents a perspective view, partly broken away, of a portable stove embodying the invention. Fig. 2 represents a side elevation of the same, the lamp having been removed. Fig. 3 represents a side elevation of the lamp detached. Fig. 4 represents a section of a portion of the bottom of Fig. 1, on an enlarged scale.

Similar letters of reference indicate corresponding parts in the figures.

Referring to the drawings:—A designates the body of the stove, the same being open at top and bottom and preferably of cylindrical form, it being provided with the bail or handle B and having at bottom the bead or shoulder C, and in its sides the openings D.

E designates a lamp of the order of alcohol, gasolene or the like, the same being composed of the reservoir F, the packing G of asbestos or similar material, the foraminous burner H and the neck J, the latter having a covering-cap K for evident purposes.

The reservoir F is connected with the base L, which is greater than the diameter of the body A, so that the latter may rest on said base and so close the bottom of the body.

On the periphery of the base are clips or clasps M, which are adapted to connect the lamp with the body A, they being resilient in their nature, whereby they may be sprung on the bead C, so as to firmly hold the lamp in position, while being capable of being drawn out so as easily to disconnect the lamp.

The open top of the body is adapted to sustain thereon a pan, kettle or other culinary vessel, so that when the lamp is ignited, the heat of the same readily reaches the same and so accomplishes the stewing, frying, cooking, etc. in said vessel in a convenient and practical manner, while the stove provides a simple, inexpensive and compact device for the purpose intended.

Should the fluid of the lamp be exhausted, the lamp is removed and the body placed on the ground as a base, when wood or other fuel is inserted in the body and ignited, thus providing the necessary heat, air being admitted to the fire through the bottom openings D, while the surplus hot air escapes from the body through the top openings D, said openings serving as vents for the purpose stated.

When the lamp is reapplied and secured, the stove may be rested thereon as its base, while the lamp forms the bottom closure of the stove, both the stove body and lamp being carried, as one, by the handle, and the body serving as a convenient receptacle for other utensils, food, etc.

Having thus described my invention, what I claim as new and desire to secure by Letters Patent, is:—

1. In a portable stove, a body open at top and bottom and vents in its sides near the top and bottom, a detachable base extending laterally beyond the sides of said body and receiving the latter, a lamp carried by said base and extending within the body, and resilient means on the under side of the base of the lamp and having portions extending around the base of the lamp and arranged wholly exteriorly of and engageable with the base of said body.

2. In a portable stove, a body open at top and bottom and vents in its sides near the top and bottom, a detachable base extending laterally beyond the sides of said body and receiving the latter, a lamp carried by said base and extending within the body, and resilient means on the under side of the base of the lamp and having portions extending around the base of the lamp and arranged wholly exteriorly of and engageable with the base of said body, said lamp having a fireproof backing resting upon the bottom thereof.

3. A portable stove composed of a body open at the top and bottom and having vents in its sides near the top and bottom and an exterior shoulder at its lower end, a lamp occupying the lower portion of said body and provided with an outwardly extending base member forming a seat for the bottom of the body and a closure for said bottom, and fastening devices on the base of the lamp, secured to the under side thereof and having portions extending outwardly beyond the outer edge of the base of the lamp and inwardly toward the body and engageable with said shoulder.

WALTER B. SEELEY.

Witnesses:
JOHN A. WIEDERSHEIM,
HARRY C. DALTON.